(12) United States Patent
Gibson (10) Patent No.: US 7,212,487 B2
(45) Date of Patent: May 1, 2007

(54) DATA READOUT ARRANGEMENT

(75) Inventor: Gary A. Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 580 days.

(21) Appl. No.: 10/751,880

(22) Filed: Jan. 7, 2004

(65) Prior Publication Data

US 2005/0147017 A1   Jul. 7, 2005

(51) Int. Cl.
*G11B 7/00*   (2006.01)

(52) U.S. Cl. .................................................. 369/126

(58) Field of Classification Search ................ 369/100, 369/126
See application file for complete search history.

(56) References Cited

U.S. PATENT DOCUMENTS

| | | | |
|---|---|---|---|
| 3,842,194 A | 10/1974 | Clemens | |
| 3,920,930 A | 11/1975 | Sobczyk | |
| 4,340,956 A | 7/1982 | Miller | |
| 4,450,550 A | 5/1984 | Sterzer | |
| 4,912,822 A | 4/1990 | Zdeblick et al. | |
| 4,998,016 A | 3/1991 | Nose et al. | |
| 5,015,850 A | 5/1991 | Zdeblic et al. | |
| 5,053,995 A | 10/1991 | Kajimura et al. | |
| 5,235,187 A | 8/1993 | Arney et al. | |
| 5,283,437 A | 2/1994 | Greschner et al. | |
| 5,289,004 A | 2/1994 | Okada et al. | |
| 5,329,513 A | 7/1994 | Nose et al. | |
| 5,345,815 A | 9/1994 | Albrecht et al. | |
| 5,371,728 A | 12/1994 | Sakai et al. | |
| 5,373,494 A | 12/1994 | Kawagishi et al. | |
| 5,398,229 A | 3/1995 | Nakayama | |
| 5,412,641 A | 5/1995 | Shinjo et al. | |
| 5,426,631 A | 6/1995 | Miyazaki et al. | |
| 5,526,334 A | 6/1996 | Yamano et al. | |
| 5,537,372 A | 7/1996 | Albrecht et al. | |
| 5,546,374 A | 8/1996 | Kuroda et al. | |
| 5,583,286 A | 12/1996 | Matsuyama | |
| 5,610,898 A | 3/1997 | Takimoto et al. | |
| 5,679,952 A | 10/1997 | Lutwyche et al. | |
| 5,680,387 A | 10/1997 | Yamano | |
| 5,751,683 A | 5/1998 | Kley | |
| 5,751,685 A | 5/1998 | Yi | |
| 5,753,911 A | 5/1998 | Yasuda et al. | |
| 5,856,672 A | 1/1999 | Ried | |
| 5,883,705 A | 3/1999 | Minne et al. | |
| 5,953,306 A | 9/1999 | Yi | |
| 5,969,345 A | 10/1999 | Williams et al. | |
| 5,994,698 A | 11/1999 | Kawade et al. | |
| 6,072,764 A | 6/2000 | Shido et al. | |
| 6,218,086 B1 | 4/2001 | Binnig et al. | |
| 6,337,477 B1 | 1/2002 | Shimada et al. | |
| 6,369,385 B1 | 4/2002 | Muray et al. | |

(Continued)

Primary Examiner—Nabil Hindi (57) ABSTRACT

A readout arrangement has a base which has a flexible member supporting a probe on a free end thereof so that the probe is movable with respect to the base; a medium in which a superficial data indicative topographical feature can be formed, the superficial data indicative topographical feature being configured to be contacted by the probe, the medium and the base being arranged to be movable relative to one another; and a semiconductor element disposed with one of the base and medium, the semiconductor element being configured to be responsive to an electric field generated in response to interaction between the probe and the superficial data indicative topographical feature.

34 Claims, 4 Drawing Sheets

U.S. PATENT DOCUMENTS

| | | |
|---|---|---|
| 6,401,526 B1 | 6/2002 | Dai et al. |
| 6,465,782 B1 | 10/2002 | Kendall |
| 6,477,132 B1 * | 11/2002 | Azuma et al. .............. 369/126 |
| 6,515,957 B1 | 2/2003 | Newns et al. |

* cited by examiner

DATA READOUT ARRANGEMENT

BACKGROUND OF THE INVENTION

It has been hitherto been proposed to sense data which is written onto a movable medium using a probe that is supported on a cantilever and used to contact the movable medium. A heated element (heater) is provided in/on the cantilever proximate the probe. The heater is heated by passing a current of electricity therethrough. By using heat transfer characteristics between the movable medium and the probe (or a portion of the cantilever in which the heating element is formed), it is possible to determine minute changes in distance between the movable medium and the cantilever on which the probe is carried, and to use this as a means for reading out the data stored on the movable medium.

The heater in the cantilever can be used for either/both reading and writing. The reading function uses a thermal readback sensor arrangement which exploits a temperature-dependent resistance function. In this arrangement, the resistance (R) may increase with heating power/temperature from (for example) room temperature to a value of 500–700° C. (writing). The peak temperature may be determined by the doping concentration in the heater platform, which may range from $1 \times 10^{17}$ to $2 \times 10^{18}$. Above the peak temperature, the resistance may drop as the number of intrinsic carriers increases because of thermal excitation.

During sensing, the resistor may operate up to about 300–350° C. This temperature may be selected to not soften the polymer medium but allow thermal conduction through the gas between the cantilever on which the probe is carried, and the moving medium, to remove heat and thus provide a parameter which allows the distance between the cantilever on which the probe is carried and the medium on which the probe is running to be measured.

That is to say, this thermal sensing is based on the fact that the thermal conductance between the heater platform and the storage substrate changes according to the distance between them. The medium between a cantilever and the storage substrate, usually air, transports heat from one side to the other. When the distance between heater and sample is reduced as the probe moves into a bit indentation, heat is more efficiently transported through the air and the heater's temperature and hence its resistance decreases. Thus, changes in temperature of the continuously heated resistor are monitored while the cantilever is scanned over data bits, providing a means of detecting the bits.

Under typical operating conditions, the sensitivity of the thermomechanical sensing may be even better than that of piezoresistive-strain sensing inasmuch as thermal effects in semiconductors can be stronger than strain effects.

Nevertheless, the thermal response has been found to be slower than desired and is slower than the cantilever's ability to follow the data pattern written in the medium. This leads to the system's read performance being slower than it would be if it were not limited to the thermal response of the sensing system.

DETAILED DESCRIPTION OF THE EXEMPLARY EMBODIMENTS

Figure 1:
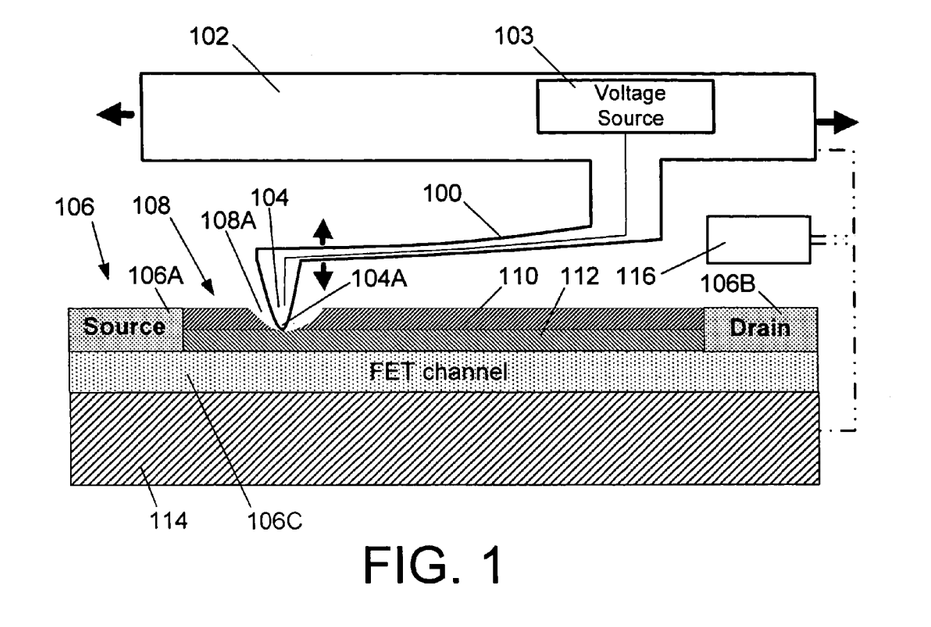
FIG. 1 is a schematic side view of a first embodiment of the invention.

FIG. 1 shows a first embodiment of the invention. In this arrangement, a flexible member, in the form of a cantilever 100, is supported on a base 102 and is configured to be electrically conductive (or is configured to contain an electrical conducting path). This can be achieved either through doping or the deposition of an electrically conductive trace. The base 102 can be a chip on which a plurality of cantilevers is formed.

The base or chip 102 is provided with or connected to a voltage source 103 which controls the level of voltage or bias which is applied to the tip 104A of a probe 104 that is formed at the free end of the cantilever 100. The detection or sensing element in this embodiment is a FET 106 that is built into or integrated with the storage medium 108.

As shown, the topography of the medium 108 is modified by the formation of a recesses or divots 108A (only one shown) therein. The recess or divot 108A represents a bit of information which is written at a predetermined set of coordinates on the medium 108 by using a separate heated, microfabricated writing probe tip (not shown) which is supported on a flexible suspension (e.g. a cantilever). This writing probe, which is heated by a nearby integrated heater, is used to locally soften the top medium layer 110 (typically made of a polymer such as polymethylacrylate PMMA or polycarbonate). These layers can be approximately 40 nm thick. It should be noted however, that as the storage layer is made thicker, it becomes more difficult to control the size of the bits (the harder underlying layer no longer acts as a bit stop). If the storage layer is too thin a variety of problems tend to occur, such as thickness non-uniformities, tip wear, etc. Some of these issues are related to the length of the molecules. A very shallow bit is also problematic in that it doesn't provide sufficient displacement and therefore signal.

A small downward force is applied to the writing probe tip by its suspension so that it creates the small depression while hot. Typically, but not necessarily, the soft data layer 110 is deposited on top of a somewhat harder layer 112. This harder layer 112 acts to limit the depth of the divot 108A, but is still soft/compliant enough to help protect the tip of the readout probe 104 from wear and shock. This harder layer 112 is deposited upon a substrate 114 which, in this embodiment is a material such as silicon.

The FET 106 in this embodiment is formed by doping (e.g. implanting, or diffusing) regions of the silicon substrate 114 to form the source 106A, drain 106B, and channel 106C. Alternatively, it can be built by deposition of the appropriate materials and contacts onto a silicon or like type of substrate material.

Recesses or the like can then be etched or otherwise formed to facilitate the deposition of the two polymer layers 110, 112 and locate the polymer layers over a region in which the FET channel 106C is formed. It will be appreciated that the present invention is not limited to the formation of recesses/divots as topographical bits, and that, although the topography is shown as comprising a data recess or divot 108A, these features can be replaced with humps (not shown) or a combination of pits and humps. It should be noted that these humps (if used) should be isolated from the pits so as not to be not confused with the raised ring that, in actual practice, tends to form around the mouth of the pits or divots 108A like a lunar impact crater.

To read the data, the probe 104 is either scanned across the storage medium 108, or the medium 108 is moved with respect to the probe 104, using a device 116 such as a microfabricated x-y stage. Upon probe 104 assuming a position corresponding to a predetermined set of medium coordinates, it is determined if the probe 104 has encountered a topographical feature such as a divot or hump (i.e. a topographical bit). In the event that the probe 104 engages the topographical bit (e.g. enters the divot 108A in the manner depicted in FIG. 1) the gap between the probe 104 and the base 102 on which the cantilever 100 is suspended, varies along with a change in the distance between the tip of the probe 104 and the FET channel 106C. In this embodiment, this motion of the probe/suspension is detected by applying a voltage to conducting portions of the probe/suspension that induces an electric field in its vicinity. This electric field impinges on the FET channel 106C in a manner which modulates its conductance. The variation in distance between the probe 104 and the FET channel 106C therefore modulates the conductivity of the FET 106.

One mechanism via which this conductance is modified is via the electric field either attracting additional carriers to the channel or repelling carriers from it (or "opening" or "pinching off" a channel). Changes in the conductance of the FET 106 are monitored to detect the presence or absence of a topographic bit at the coordinates in which the probe 104 is positioned.

It will be appreciated that a number of and/or a pattern of topographical bits could be formed between the source and the drain and thus use the same FET to detect the presence/absence of a bit at a given number of medium coordinates.

It should also be appreciated that the configuration of the FET source, drain and channel in FIG. 1 is purely schematic and that the source 106A and drain 106B regions of the FET 106 need not be formed at the same level or thickness as the polymer layers and that any suitable configuration which permits the probe 104 to approach or be distanced from the channel 106C of the FET falls in the scope of this embodiment. A person skilled in the art of semiconductor fabrication would be fully capable of devising various configurations on a silicon or like type of substrate which would enable this embodiment to be made and used without undue experimentation.

That is to say, while the embodiments of the invention are illustrated and disclosed as including a depletion mode FET, it is possible to use an induced-channel type FET. This induced-channel or enhancement mode FET is such that there is no intrinsic channel and the drain to source conductance is very low until the gate voltage is applied. When the gate voltage exceeds a given threshold, enough carriers are pulled into the channel region that the device starts to conduct. In an N-channel enhancement type FET, the channel is p-type material that forms a conduction band when sufficiently positive gate voltage is applied. When conducting, the channel behaves like n-type material.

Figure 2:
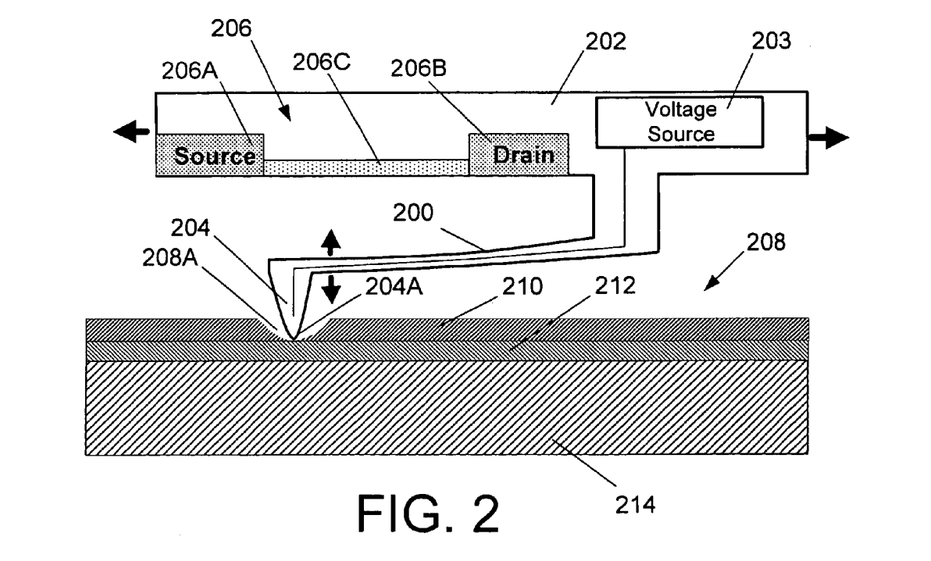
FIG. 2 is a schematic side view of a second embodiment of the invention.

A second embodiment is shown in FIG. 2. In this second embodiment the detection FET 206 is built into the platform 202 on which the probe/suspension (204/200) are mounted. It should be noted that throughout the disclosed embodiments, the suspension is shown as being a cantilever. However, any flexible suspension arrangement can be used. One alternative, for example, is to build the probe on a flexible diaphragm. Note that other devices whose conductance is affected by the application of an electric field (or proximity of a material held at some electrostatic potential), such as other types of transistors and diodes, could be used in place of the FET disclosed in connection with the embodiments of the invention.

Also, note that instead of making all or part of the probe/suspension conducting so that an electrostatic potential can be applied to it, all or part of the probe/suspension could be made of a material with a suitable electric dipole moment. One possible material that can meet this requirement is one that has a remnant polarization such as a ferroelectric material (e.g. PZT—Lead Zirconate Titanate). Displacement of the polarized material relative to the channel of the FET in any of the disclosed embodiments would again alter the electric fields applied to the channel and impact its conductance, thereby providing a signal.

The impact of the relative motion of the charged or dipole probe/suspension relative to the FET channel can be made to have a larger impact on the channel's conductance by properly designing the geometry of the system. The active (charged or dipole) area of the probe/suspension should be kept relatively large compared to the channel area and the nominal gap between the active portions of the probe/suspension and channel should be kept small. In addition, a sharp probe tip could be used to create relatively large fields and field gradients in portions of the FET channel where they have a large impact on the overall conductance of the FET.

The size, shape, and material properties of the probe suspension must be consistent with the desired mechanical properties of the suspension which, in many cases, are dictated by requirements on bandwidth, tip/media loading force, dynamic range, etc. Note that the embodiments of the readout arrangement are such that the sharp probe tip provides high spatial resolution but a relatively large area of the suspension is used to induce a signal.

The embodiments of the invention can be compared with the prior art of the nature discussed above wherein there is a large change in the heat transfer between the suspension and the storage medium when there is a small change in the gap between them. In the present invention there is a change in the fields applied to the FET channel over a relatively large area induced by the interaction of a small/sharp probe with a small topographic bit.

The readout technique utilized in the embodiments of the invention is not fundamentally limited in bandwidth by the thermal time constants of the probe/suspension and its heater. Further, the power required for readout can be less than that of the prior art thermal readout because it isn't necessary to constantly heat the probe during the read process.

Signal improvements can be achieved by increasing the voltage applied to the probe suspension. This increases the electric fields available for modifying the conductance of the FET channel.

Note that this readout scheme can be used with any storage medium in which bits are stored topographically. The media need not consist of a pair of soft and (relatively) hard layers as described above. The media can be any material or set of materials in which bits can be stored topographically. The bits can be either pits or protrusions, or combinations of both, and can be written by means other than thermal writing.

Multiple probes and FETs can be used in parallel to achieve higher data read and write rates. It is possible to use one FET channel for multiple probes. However, there must be at least one FET for each probe that is active at a given time.

The second embodiment shown in FIG. 2 has an advantage over that shown in FIG. 1 in that both the FET 208 and the suspension/probe (200/204) are formed in/on the base 202 whereby the position of the suspension/probe (200/204) relative to the FET 206 is essentially fixed save the displacement of the suspension/probe (200/202) toward and away from the base 202 and the FET 206 formed therein. That is to say, In FIG. 1, the impact of vertical displacements can vary as the position of the probe/suspension (104/100) varies laterally (albeit by a small amount) relative to the FET 106. On the other hand, the second embodiment builds the sensing devices (e.g. FETs) onto the same substrate/platform as the micromachined probe/suspension components.

Figure 3:
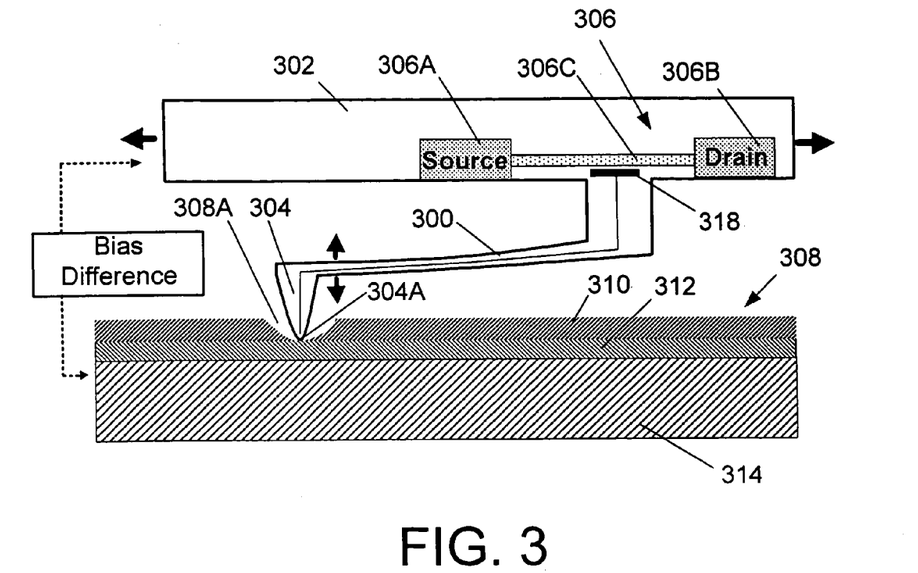
FIG. 3 is a schematic side view of a third embodiment of the invention.

FIG. 3 shows a third embodiment of the invention. In this embodiment, a bias is applied across the substrate 314 which is made of an electrically conductive material, and the chip or base 302.

Alternatively, in lieu of applying the bias to the substrate 314, a conductive layer can be provided on the substrate 314. This can take the form of an additional layer 312 under one of the polymer layers or the situation wherein one of the polymer layers themselves is conductive, and applying the bias to this layer. This conductive polymer layer can be formed of a conductive polymer such as SU8 which is a near-UV photoresist that is commonly used in MEMS (Microelectromechanical System) fabrication.

The antenna/gate 318, which can include a conductive antenna that extends along the cantilever or other flexible suspension, floats to a potential that is determined by cantilever/tip position relative to the biases on the substrate 314 of the storage medium and cantilever support chip or base 302. The change in distance between the tip of the probe 304 and the substrate 314 induces a change in the potential appearing on the antenna/gate 318. This modulates the potential on the FET's gate contact, thereby modulating the transimpedance parameter of the FET 306 to yield a signal.

Figure 4:
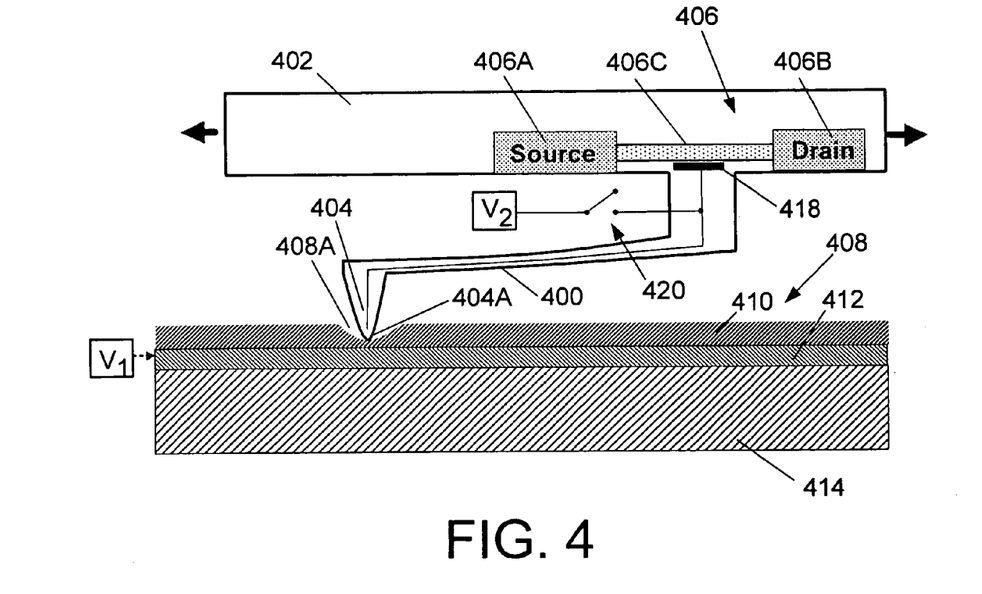
FIGS. 4 and 5 are schematic side views of a fourth embodiment of the invention depicting the situation wherein a switch which controls the application of a voltage to the gate of the FET and that is formed in the cantilever base, is respectively open and closed.
Figure 5:
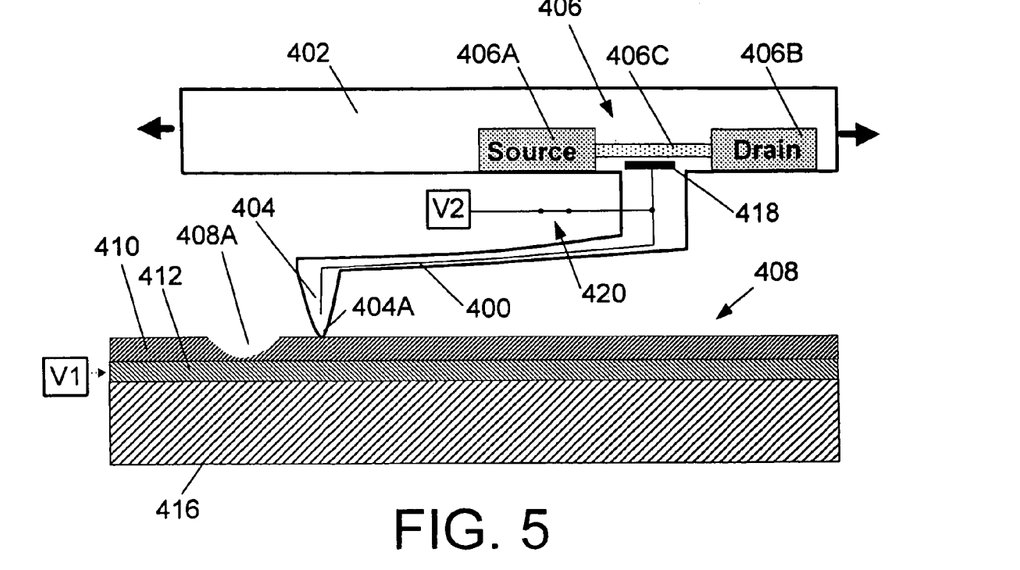

FIGS. 4 and 5 show a fourth embodiment of the invention. In this embodiment the cantilever/gate 418 is driven to a potential close to that of the storage medium when the probe 404 drops into a recorded pit. V1 is at a potential that, if applied to the FET's gate 418, will either open or close the channel 406C between its source 406A and drain 406B.

This is assumed to involve a mechanism wherein, when the tip of the probe 404 gets close enough to the conducting layer 412 when it drops into a pit to actually transfer some charge to it. This could occur through "contact", quantum mechanical tunneling of charge from tip to film (or vice versa), field-emission of electrons from tip to film, or some other form of conduction (e.g. hopping) between tip and film. Alternatively, the tip of the probe 404 does not get close enough to the conducting film for charge transfer to occur, but the capacitive coupling parameter between the probe tip and/or other parts of the flexible suspension and the conductive film changes. This topographically-induced change in capacitance acts as a control parameter which will induce a change of potential on the gate.

A potential close to V2 has the opposite effect on the channel. Switch 420 is used to reset the cantilever/gate voltage to V2 after probe tip passes over a pit (see FIG. 5). The switch 420 can take the form of a transistor which is formed in the chip or base 402 and which is connected to a source of voltage by way of traces which are doped into the chip or base 402. FIG. 5 shows the cantilever/gate 418 driven to a potential close to V2 when the probe tip is between pits. V2 is at a potential that, if applied to the FET's gate, will either close or open the channel between its source and drain (viz., an effect opposite to the effect of V1).

In the case where the tip of the probe 404 makes direct contact with layer 412 when in a pit, the layer 412 can be made of relatively soft material in order to minimize wear. A conducting polymer such as polyaniline (PAni) or polypyrrole (PPY) can be used to form the layer 412. In cases where the tip 404A does not make direct contact with the conducting layer 412, the layer could be made of any convenient conductor, including Al, Mo, etc. In this case, layer 410 could actually consist of two polymer layers—a top, soft polymer layer such as PMMA and a harder, pit-limiting polymer layer such as SU8.

Figure 6:
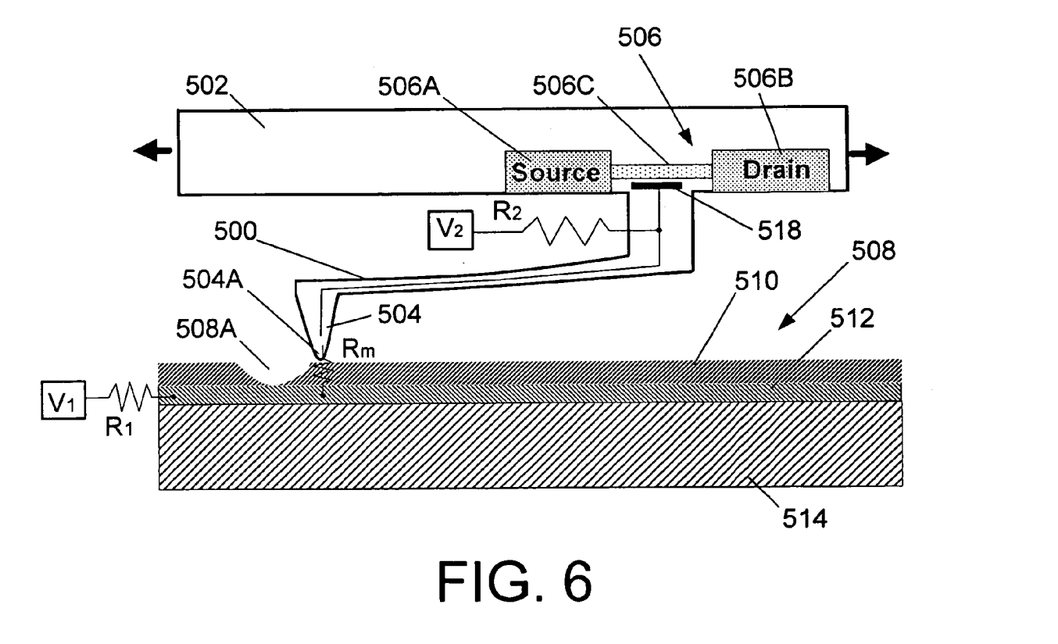
FIG. 6 is a schematic side view of a fifth embodiment of the invention.

FIG. 6 shows a fifth embodiment of the invention. In this embodiment the cantilever/gate (500/518) is driven to a potential close to either V1 or V2 depending on whether the resistance (Rm) between the probe tip and the conducting portions of the storage medium is high or low. When the tip is in a pit a R1+Rm parameter is low relative to R2 and the cantilever/gate potential is close to V1. When the tip is not in a pit, the R1+Rm parameter is large relative to R2 and the cantilever/gate (500/518) potential is close to V2. V2 is at a potential that, if applied to the FET's gate, will either close or open the channel between its source and drain (opposite to effect of V1). R1 may or may not be necessary (it can be used, for example, to prevent damage due to excessive currents). The value of resistances should be kept low so as to reduce the RC time constant response time of the cantilever/gate potential. For the same reason, stray capacitance between cantilever/gate and rest of world should be kept to a minimum. Note that the resistance Rm can include effective tunneling or field emission resistances. Voltages V1 and V2 can be on the order of a few volts.

Layer 510 can include a relatively soft, low melting (or softening) point data layer such as PMMA. Layer 512 can include a conducting layer (such as polyaniline (PAni) and polypyrrole (PPY)), but might also include a pit-stop layer such as SU8 if the conducting layer is not adequate in this regard.

Figure 7:
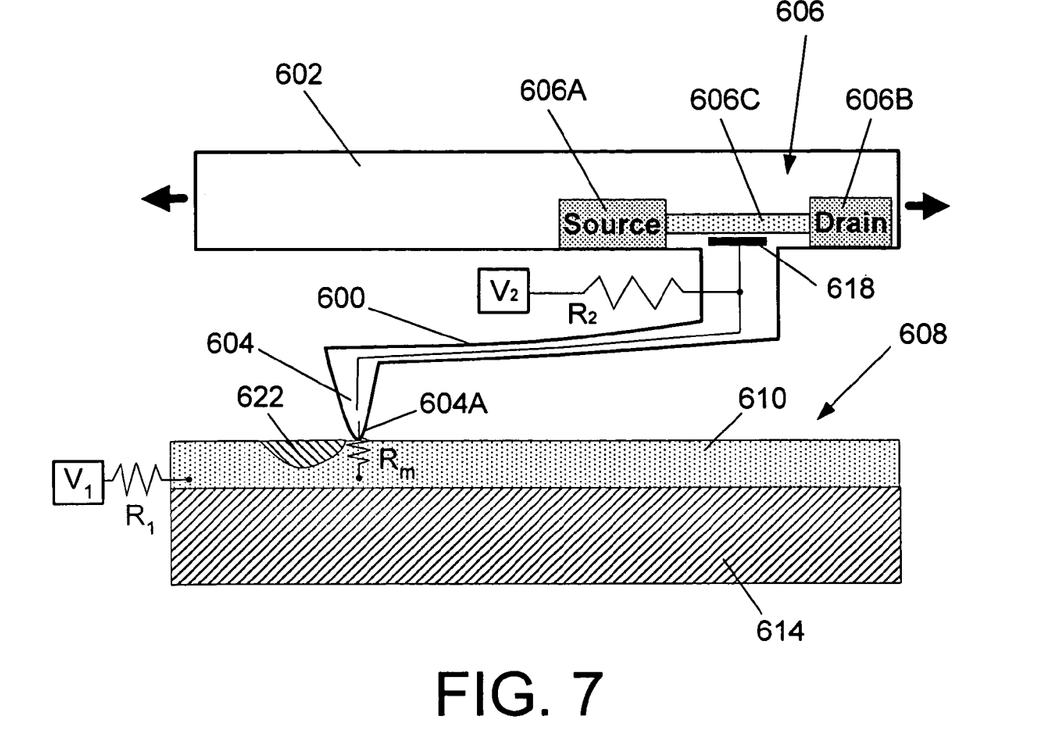
FIG. 7 is a schematic side view of a sixth embodiment of the invention.

FIG. 7 shows a sixth embodiment of the invention. This embodiment is similar to that shown in FIG. 6 with the exception that information is stored as resistivity changes in a phase-change material 622. This phase-change material forms the topographical feature in this embodiment. Such phase-change materials provide a large, cyclable change in electrical conductivity are chalcogenides. Examples of this material are GeSbTe, $Ge_2Sb_2Te_5$, $GeSb_2Te_4$, etc. Alternatively, the V1 supply could be connected to the substrate 614 if it is made of a conducting material.

It should be noted that the phase-change material doesn't need to filled into a physical recess. In this embodiment it is possible to start with a phase-change layer, such as GeSbTe, and locally alter its conductivity through the proper application of heat. This may involve only negligible changes in topography. Phase-change materials such as GeSbTe can exhibit 5 or more orders of magnitude greater conductivity in the crystalline state than in the amorphous state. To change from crystalline to amorphous the material is heated to melting, then rapidly cooled ("quenched") so that it doesn't have time to recrystallize. To go from amorphous to crystalline it is heated above it's crystallization temperature ("annealing temperature") long enough to recrystallize. In this manner it is possible to form localize areas in the manner depicted in FIG. 7.

Although the invention has been described with reference to only a limited number of embodiments it will be understood that variants and modifications of the invention, which is limited only by the appended claims, will be readily envisaged by the person skilled in the art to which this invention pertains or most closely pertains, given the preceding disclosure.

What is claimed is:

1. A readout arrangement comprising:
   a base, the base having a flexible member which supports a probe on a free end thereof so that the probe is movable with respect to the base;
   a medium, the medium being configured so that at least one data indicative topographical feature is formable therein, the superficial data indicative topographical feature being configured to be contacted by the probe, the medium and the base being arranged to be movable relative to one another;
   a Field Effect Transistor (FET) disposed with one of the base and medium, the FET being configured to be responsive to an electric field generated in response to interaction between the probe and the superficial data indicative topographical; and
   wherein the medium is supported on a substrate in which the FET having a source, drain and channel is formed, and wherein the medium is configured so that the superficial data indicative topographical feature is located in operative proximity to the channel of the FET.

2. A readout arrangement as set forth in claim 1, wherein the flexible member comprises a cantilever which extends from a base member and which has the probe formed at a free end thereof.

3. A readout arrangement as set forth in claim 2, wherein the cantilever is formed of silicon.

4. A readout arrangement as set forth in claim 2, wherein the cantilever includes at least portions formed of an electrically conductive material.

5. A readout arrangement as set forth in claim 2, wherein the cantilever includes at least portions of a material having an electric dipole moment.

6. A readout arrangement as set forth in claim 1, wherein the flexible member is configured so that at least a part of the flexible member and the probe radiate an emission that influences the conductivity of the channel of the FET, and further configured so that when the probe contacts the superficial data indicative topographical feature, a distance between the probe and the base changes and modulates the amount of current passing through the FET.

7. A readout arrangement as set forth in claim 1, wherein the FET is formed in the base and the flexible member is configured so that at least a part of the flexible member and the probe radiate an emission that influences the conductivity of the channel of the FET, and further configured so that when the probe contacts the superficial data indicative topographical feature, a distance between the probe and the base changes and modulates the amount of current passing through the FET.

8. A readout arrangement as set forth in claim 1, wherein the FET is formed in the base, the FET having a source, a drain, a channel and a gate, and wherein the flexible member and probe are at least in part electrically conductive and electrically connected to the gate, wherein the medium is supported on an electrically conductive substrate configured to have an electrical bias applied thereto from a source of electrical bias, and wherein the superficial data indicative topographical feature varies with at least one of the distance and resistance between the electrically conductive substrate and the probe to vary the bias applied to the gate of the FET and modulate the amount of current passing through the FET.

9. A readout arrangement as set forth in claim 8, further comprising a switch which is configured to selectively connect the gate of the FET to a second source of electrical bias which electrical bias is different from the bias which is applied to the medium and which modifies the modulation of the current through the FET when the switch is closed.

10. A readout arrangement as set forth in claim 9, wherein the switch is configured to be one of open and closed when the probe contacts the superficial data indicative topographical feature and to be the other of open and closed when the probe contacts a portion of the medium which is free of the superficial data indicative topographical feature.

11. A readout arrangement as set forth in claim 8, further comprising a second source of electrical bias which is electrically connected with the gate of the FET through a resistance, and wherein a resistance between the probe and the substrate functions to modulate the amount of current which passes through the FET.

12. A readout arrangement as set forth in claim 11 wherein the superficial data indicative topographical feature comprises a phase change material with an electrical conductivity that is set by the phase of the phase-change material.

13. A readout arrangement as set forth in claim 1, wherein the readout arrangement comprises a readout out arrangement for a contact probe mass storage device.

14. A method of forming a readout arrangement comprising:
   supporting a probe on a base by way of a flexible member;
   arranging a medium so that one of the medium and the probe is movable with respect to the other, and so that a superficial data indicative topographical feature that is configured to be contacted by the probe, is formable in the medium; and
   forming a Field Effect Transistor (FET) wherein the FET has a source region. a drain region and channel region in a substrate on which the medium is formed so as to be associated with one of the base and the medium and configuring the FET to be responsive to an emission which is emitted from one or both of a) a portion of the probe and the flexible member, and b) a substrate on which the medium is supported, and configuring the FET to undergo a change in conductivity in response to contact between the probe and the superficial data indicative topographical feature which changes a parameter associated with the emission.

15. A method as set forth in claim 14, further comprising forming the superficial data indicative topographical feature at a location wherein the probe contacts the superficial data indicative topographical feature when the probe assumes a predetermined position with respect to the medium.

16. A method as set forth in claim 14, further comprising forming the superficial data indicative topographical feature as one of a recess and a hump.

17. A method as set forth in claim 14, wherein the superficial data indicative topographical feature comprises a phase change material.

18. A method as set forth in claim 14, comprising forming the substrate on which the medium is supported, of an electrically conductive material.

19. A method as set forth in claim 14, comprising forming an electrically conductive layer on the substrate.

20. A method as set forth in claim 14, comprising forming the portion of the probe and the flexible member of an electrically conductive material.

21. A method as set forth in claim 14, further comprising the step of locating the data indicative topographical feature in the medium so as to be immediately proximate the channel of the FET.

22. A method as set forth in claim 14, further comprising the step of locating a plurality of data indicative topographical features in the medium so that each feature is located between the source and drain of the FET.

23. A method as set forth in claim 14, comprising forming the FET in the base and configuring the FET so as to be responsive to a change in a distance between the probe and the base which is induced by contact between the probe and the data indicative topographical feature.

24. A method as set forth in claim 23, comprising disposing a switch with the base and selectively applying a bias to a gate forming part of the FET, and configuring the switch to be open when the probe contacts the data indicative topographical feature and to be closed when the probe contacts a portion of the medium between which the data indicative topographical feature are positioned.

25. A readout arrangement comprising:
a probe supported on a base by way of a flexible member;
a medium which is configured so that one of the medium and the base are movable relative to the other and wherein the medium is configured so that a superficial data indicative topographical feature that is configured to be contacted by the probe, is formable in the medium;
FET (Field Effect Transistor) means having a source region, a drain region and channel region associated with one of the base and the medium for
i) responding to an emission which is emitted from one or both of a) a portion of the probe and the flexible member, and b) a substrate on which the medium is supported, and for
ii) undergoing a change in conductivity in response to contact between the probe and the superficial data indicative topographical feature which induces a change in a parameter associated with the emission; and
wherein the FET is formed in the substrate on which the medium is formed and wherein the data indicative topographical feature is formed in the medium so as to be immediately proximate the channel of the FET.

26. A readout arrangement set forth in claim 25, further comprising wherein the superficial data indicative topographical feature is provided at a location wherein the probe contacts the superficial data indicative topographical feature when the probe assumes a predetermined position with respect to the medium.

27. A readout arrangement set forth in claim 25, wherein the superficial data indicative topographical feature comprises one of a recess and a hump.

28. A readout arrangement set forth in claim 25, wherein the superficial data indicative topographical feature comprises a phase change material.

29. A readout arrangement set forth in claim 25, wherein one of the substrate on which the medium is supported, and an eclectically conductive layer formed thereon, is electrically conductive.

30. A readout arrangement set forth in claim 25, wherein the portion of the probe and the flexible member is electrically conductive.

31. A readout arrangement set forth in claim 25, wherein the FET is formed in the base and configured to be responsive to a change in a distance between the probe and the base that is induced by contact between the probe and the data indicative topographical feature.

32. A readout arrangement set forth in claim 31, further comprising switch means which is disposed with the base for selectively applying a bias to a gate forming part of the FET, the switch being configured to be one of open and closed when the probe contacts the data indicative topographical feature and to be the other of open and closed when the probe contacts a portion of the medium between regions containing the data indicative topographical features.

33. A readout arrangement set forth in claim 32, wherein the bias applied to the gate of the FET is selected to render the FET non-conductive.

34. A readout arrangement as set forth in claim 25, wherein the readout arrangement comprises a readout out arrangement for a contact probe mass storage device.

* * * * *

UNITED STATES PATENT AND TRADEMARK OFFICE
CERTIFICATE OF CORRECTION

PATENT NO. : 7,212,487 B2
APPLICATION NO. : 10/751880
DATED : May 1, 2007
INVENTOR(S) : Gary A. Gibson It is certified that error appears in the above-identified patent and that said Letters Patent is hereby corrected as shown below:

In column 7, line 23, in Claim 1, after "topographical" insert -- feature --.

In column 8, line 40, in Claim 14, after "region" delete "." and insert -- , --, therefor.

In column 10, line 19, in Claim 29, delete "eclectically" and insert -- electrically --, therefor.

In column 10, line 34, in Claim 32, delete "dosed" and insert -- closed --, therefor.

Signed and Sealed this

Fourth Day of November, 2008

JON W. DUDAS
*Director of the United States Patent and Trademark Office*